(12) United States Patent
Zellweger

(10) Patent No.: US 6,279,005 B1
(45) Date of Patent: Aug. 21, 2001

(54) METHOD AND APPARATUS FOR GENERATING PATHS IN AN OPEN HIERARCHICAL DATA STRUCTURE

(75) Inventor: Paul Zellweger, 12 Holworthy Pl., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/033,764

(22) Filed: Mar. 3, 1998

Related U.S. Application Data

(60) Provisional application No. 60/039,880, filed on Mar. 4, 1997.

(51) Int. Cl.[7] .................................................. G06F 17/30
(52) U.S. Cl. ......................... 707/101; 707/102; 707/522; 707/514
(58) Field of Search .................................... 707/101, 102, 707/522, 514

(56) References Cited

U.S. PATENT DOCUMENTS

| | | | |
|---|---|---|---|
| 5,041,967 | 8/1991 | Ephrath et al. | 364/200 |
| 5,261,042 | 11/1993 | Brandt | 395/156 |
| 5,295,261 | 3/1994 | Simonette | 395/600 |
| 5,388,196 * | 2/1995 | Pajak et al. | 345/329 |
| 5,630,125 * | 5/1997 | Zellweger | 707/103 |
| 5,937,163 * | 8/1999 | Lee et al. | 345/356 |
| 5,937,407 * | 8/1999 | Sakata | 707/100 |
| 5,953,724 * | 9/1999 | Lowry | 707/102 |

* cited by examiner

*Primary Examiner*—Thomas G. Black
*Assistant Examiner*—William Trinh

(57) ABSTRACT

An apparatus and method of a computer software program for generating a series of connected nodes that form a path in an open hierarchical data structure is disclosed. The paths in the open hierarchical data structure provide the basis for an end-user menu system known as a content menu. The present invention discloses the means to use a programming language or code to relate one or more sets of data, stored in an external file or in a database, to the open hierarchical data structure. The software means of the present invention decodes this input to generate a series of connected nodes in the structure, and thereby create new menu data and menu paths that lead to information objects.

18 Claims, 7 Drawing Sheets

60

| BID | Author | Title | Language | Subject | PID |
|---|---|---|---|---|---|
| A | West, T.W. | Architecture In Scotland | English | Scotland | 617 |
| B | Turner, W.J. | British Craftsmanship | English | England | 864 |
| C | Liscombe, C.W. | Francis Rattenbury and BC | English | Canada | 10 |
| D | Meyer, Peter | Schweizer Wohnhauser | German | Switzerland | 40 |

| PID | Publisher_Name | Pub_City | Pub_Country |
|---|---|---|---|
| 617 | McKay | New York | United States |
| 864 | Collins | London | England |
| 10 | University of British Columbia | Vancouver | Canada |
| 40 | Grisberger | Zurich | Switzerland |

Fig. 4b

METHOD AND APPARATUS FOR GENERATING PATHS IN AN OPEN HIERARCHICAL DATA STRUCTURE

This application claims benefit of Provisional Appl. 60/039,880 filed Mar. 4, 1997.

FIELD OF INVENTION

The present invention relates to a menu-based information management system on a computer that uses an open hierarchical data structure to organize and access information, and in particular, it discloses a method to generate menu data from sets of elements that relate to information objects in an information management system.

REFERENCES

U.S. Patent Documents

U.S. Pat. No. 5,630,125 May 13, 1997 Zellweger 395/600
U.S. Pat. No. 5,295,261 Apr. 15, 1994 Simonette 395/600
U.S. Pat. No. 5,261,042 Nov. 9, 1993 Brandt 395/156
U.S. Pat. No. 5,041,967 Aug. 20, 1991 Ephrath et. al. 364/200

Other References

Date, C. J. An Introduction to Database Systems. vol. 1, Reading, Mass.: Addison-Wesley, 1986.

Wood, Derrick. Data Structures, Algorithms, and Performance. Reading, Mass.: Addison-Welsey, 1993.

Zellweger, Paul. "Web-base Sales: Defining the Cognitive Buyer." International Journal of Electronic Markets. Vol. 7-No. 3, pp. 16–22.

Zellweger, Paul. "The Knowledge Tree." unpublished paper. copyright 1998 ArborWay Electronic Publishing, Inc. Jan. 3, 1998.

BACKGROUND OF THE INVENTION

An open hierarchical data structure (U.S. Pat. No. 5,630,125 Zellweger) produces a highly efficient menu-based retrieval technology. Zellweger (1997) identifies this easy to use, end-user retrieval technology as a content menu. In contrast to prior retrieval technologies, the structure organizes information and its content menu works like an index in the back of a book, using a list of lists to locate information. The primary advantage of the content menu is that it shows end-users what they can expect to find in an information system.

However, the only way to build an open hierarchical structure, until this disclosure, was by hand. That is, each node and menu entry had to be added to the structure, one at a time. This was consistent with prior menu management art, Brandt (U.S. Pat. No. 5,261,042) and Eprath et. al. (U.S. Pat. No. 5,041,967), but for a particularly large or richly detailed content domain, the lack of automated ways to generate menu data makes this particular approach labor intensive and expense.

Prior art to building hierarchical data structures from conventional database sources has been disclosed by Simonetti (U.S. Pat. No. 5,295,261 Apr. 15, 1994). Input data is derived from columns in a database table that all share a "natural hierarchical ordering" like columns storing information on "country, states, counties, and cities". This approach reduces storage and makes searches more efficient. To broaden query capabilities one hierarchical structure is merged with another using a common set of nodes that intersect like "cities" or "states". The result produces a structure that provides "topological map" of the database that can be navigated to help answer specific queries. However, the new structure in this art no longer functions like a conventional hierarchical access method, and it can only be used by an expert who understands both the database content and relational database technology.

OBJECT AND ADVANTAGES

It is a general object of the present invention to provide a method and apparatus for generating menu data for an open hierarchical data structure that provides the basis for an end-user menu system.

One object of the present invention is to produce the means to use a programming language or set of code to represent a set of relationships between one or more sets of external data and nodes in an open hierarchical data structure.

Another objective of the present invention is to provide the means to automate the process of building paths in an open hierarchical data structure using sets of elements stored in a variety of predetermined formats.

One objective of the present invention is to generate path segments in an open hierarchical data structure that correspond to the rules that govern its nodes and paths and thereby allow multiple paths to flow from a root node to the same information object at the end of a path.

Another object of the present invention is to produce the means to provide a program interface to generate menu data for an open hierarchical data structure.

One objective of the present invention is to provide the means to generate menu data for an open hierarchical data structure from coded arguments to a software system that can use these arguments to produce a series of connected nodes that forms a path in the structure.

SUMMARY OF THE INVENTION

The objects of the invention are attained by providing the methods and apparatus to generate menu data in an open hierarchical data structure that forms the basis for an end-user menu system. The present invention uses one or more sets of elements stored on a computer, in database structure or in a predetermined format in a file on disk, to generate this menu data. The invention does this by providing the software means to use a programming language or set of code to represent the relationship between external sets of elements and the structure that stores menu data.

BRIEF DESCRIPTION OF THE DRAWINGS

FIGS. 4a and 4b depict a graphical representation sample input data located in a database structure.

DETAILED DESCRIPTION OF THE PREFERRED EMBODIMENTS

Figure 1:
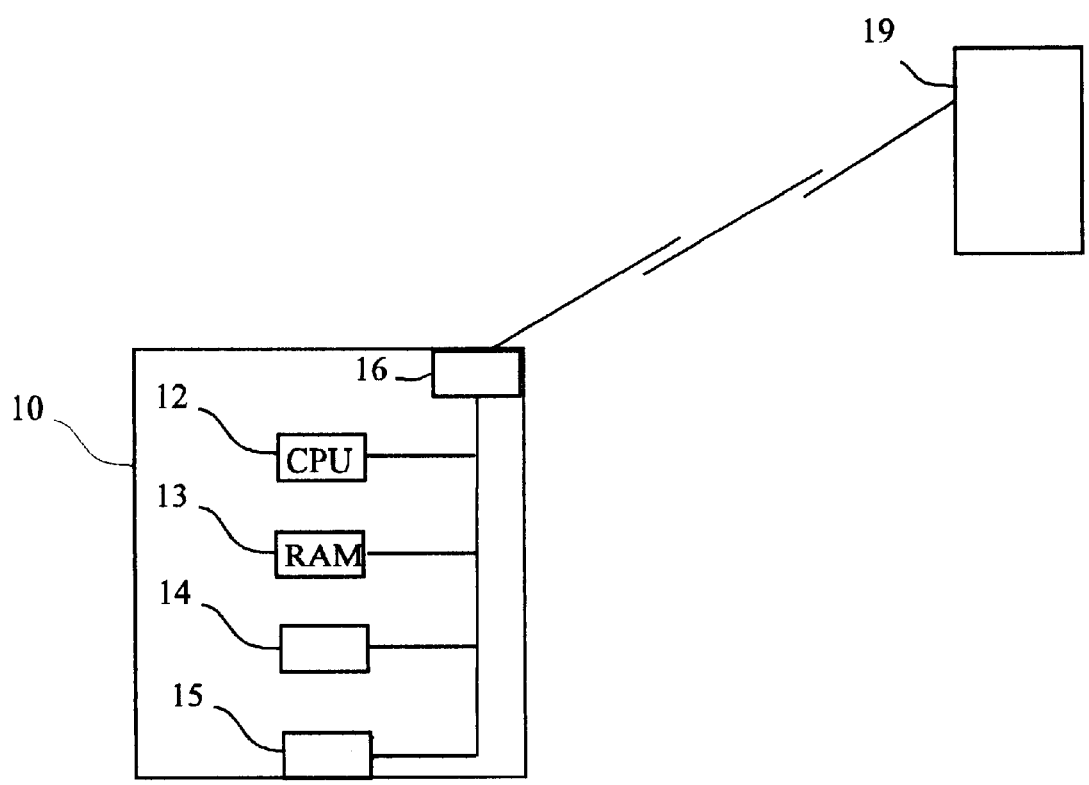
FIG. 1 is a graphical representation of the computer apparatus in the present invention.

FIG. 1 depicts the computer apparatus 10 in the present invention. A computer apparatus 10 includes a central processing unit (CPU) 12, and sources for data located on the computer, as well as the means to link to sources of data on other computers. Memory devices on a computer include fixed and removable memory apparatus. Fixed memory include fast Random Access Memory (RAM) 13, and one or more large storage device 14, also known as a hard disk. Removable memory devices 15 include computer media such as disks or tapes. In addition, a communications port 16 on computer 10 provides the means to establish electronic links to sources of data on a remote computer 19.

Software systems on computer apparatus 10 include an operating system that manages storage and file resources, and a database management system, and a communications system that manages the means to establish links to a remote computer 19.

Figure 2:
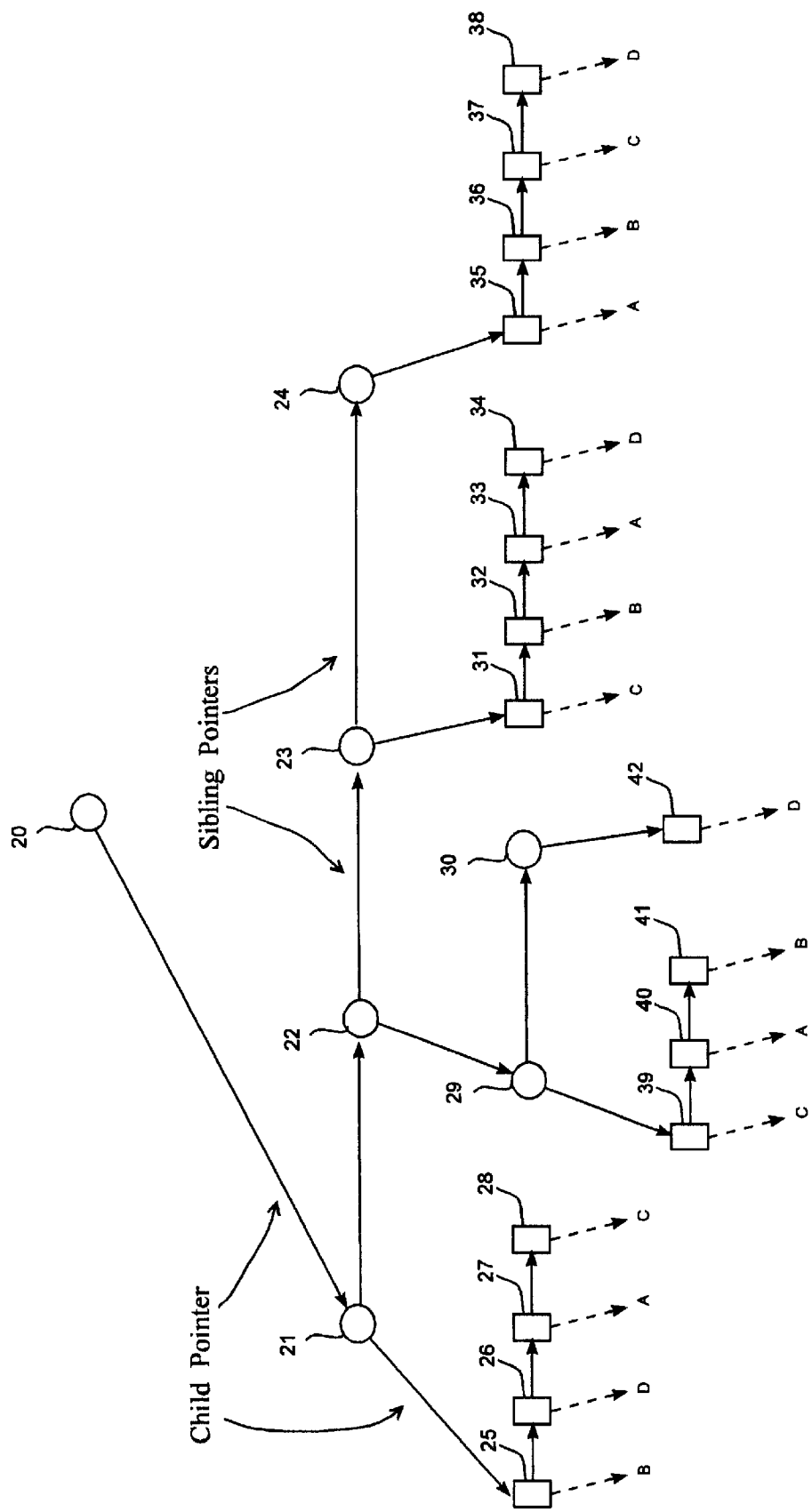
FIG. 2 is a graphical representation of an open hierarchical data structure, the prior art used to organize data for a menu system.

A graphical representation of the open hierarchical data structure is presented in FIG. 2. This structure stores menu data for the content menu. The structure has three different types of nodes: a root node, a branch node, and a leaf node. Generational terms, such as parent and child, are used to identify a node's position in relationship to another. Each node in the structure below the root node has two pointers: a sibling pointer and a child pointer.

Flow starts at root node 0 and progresses downward through one or more paths to reach information object A, B, C, or D. Enabling multiple paths to the same object is a distinctive characteristic of the open hierarchical data structure because prior to its disclosure, menu systems progressed down mutually exclusive paths.

Each path in the structure includes a root node 20, one or more branching nodes and a leaf node at the end of the path. The child pointer on a branch node, like node 21, links to another branch node, or to a leaf node like node 25. The child pointer on a leaf node links to an information object, A, B, C, or D. The sibling pointer produces a list of nodes that store menu data that corresponds to a menu list. In turn, topic data associated with each node corresponds to an entry in the list menu and its child pointer links to another list or to an information object.

Figure 3:
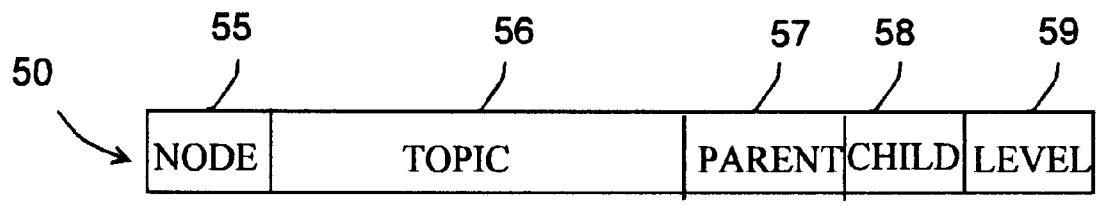
FIG. 3 is a graphical representation of a database structure that represents nodes in the open hierarchical data structure.

FIG. 3 depicts a database structure 50 that represents nodes corresponding to structure displayed in FIG. 2. Rows in table 50 provide menu data for the content menu produced by the structure. This includes information like the unique number assigned to each node in column 55, the node's parent in column 57, the node's child in 58, and the node's level in the structure in column 59. It also includes topic data in column 56 that represents an entry in a list menu.

Alternative embodiments of the open hierarchical data structure employ other database architectures, such as a network architecture or an object oriented architecture. To illustrate the present invention in this disclosure a relational database architecture will be used. However, this does not imply that other database architectures cannot be used.

To demonstrate the present invention, information on a set of books, stored in a relational database table, will be used. FIG. 4a depicts the columns and rows in the Books table 60. Each row represents a book in the set and columns represent properties about the book such as its author, title, subject matter, and so on. Detailed information on book publishers is stored in a separate Publisher table 70, depicted in FIG. 4b, that is linked to table 60 by PID column 65 to avoid problems with updates and, thereby, satisfy the need for normalization.

Figure 5A:
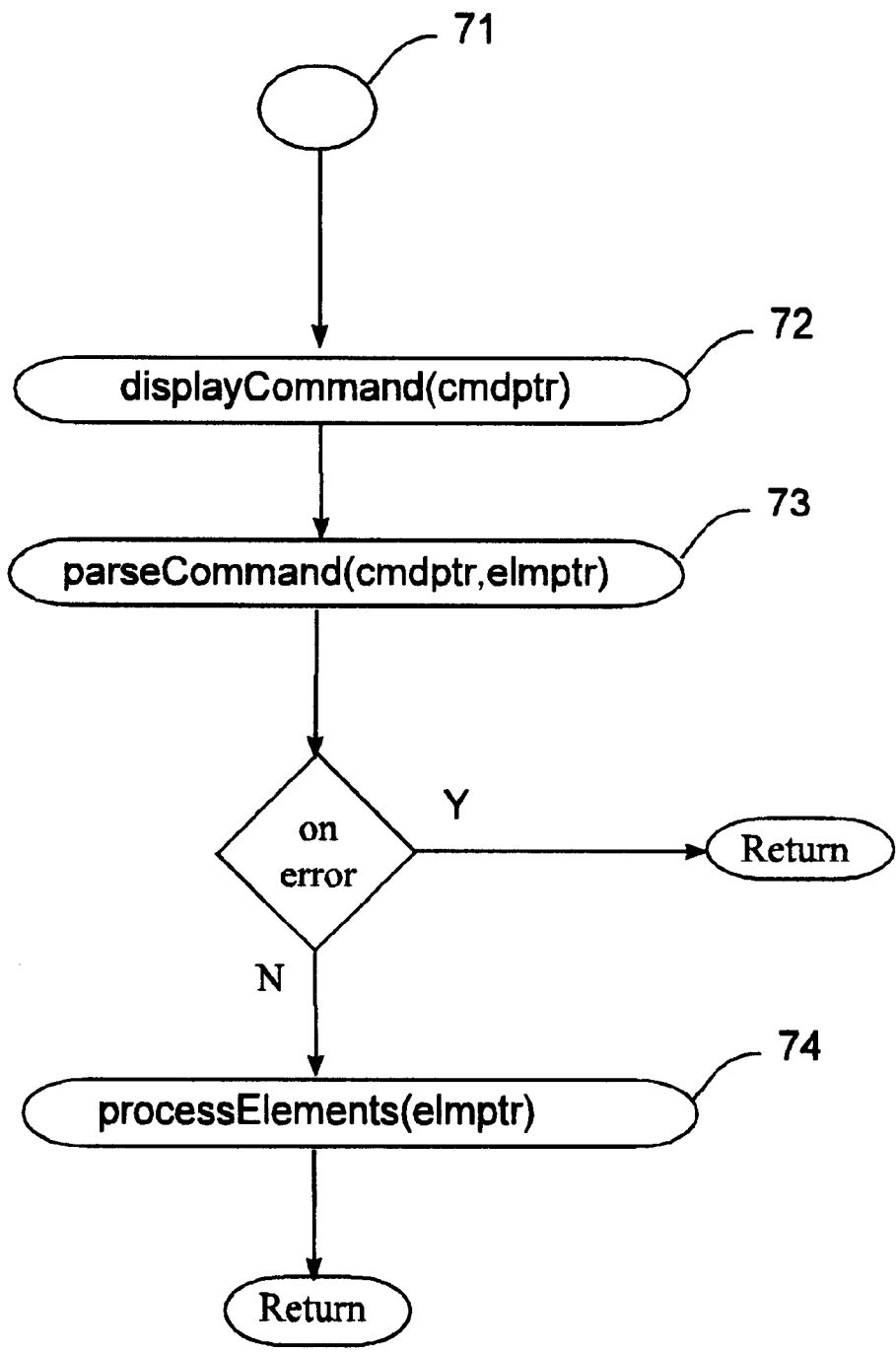
FIGS. 5a through 5c depict a graphical representation of flow charts of an embodiment of the software means representing the present invention.
Figure 5B:
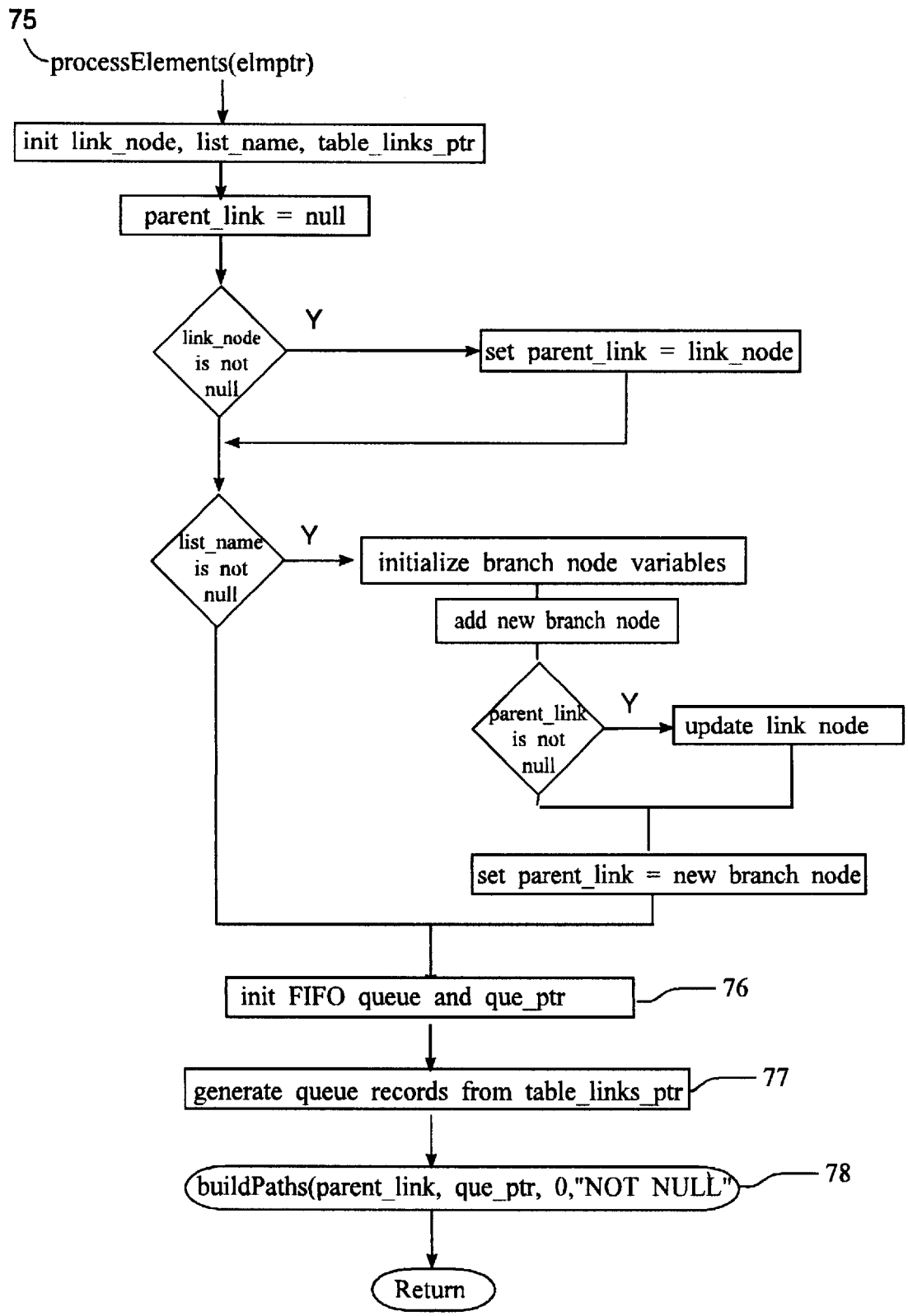
Figure 5C:
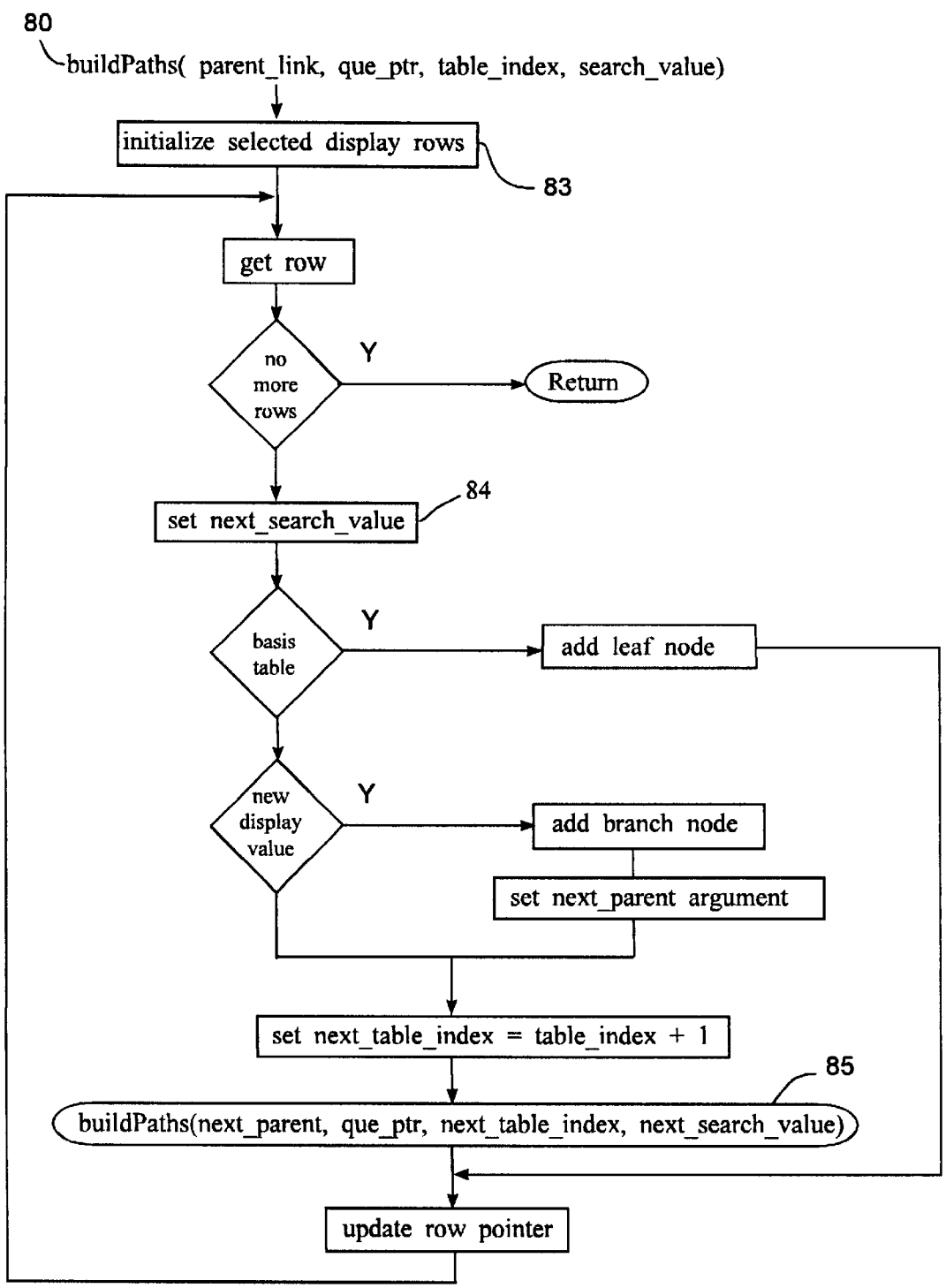

FIGS. 5a–5c depict flow charts of an embodiment of the software means of the present invention. This embodiment employs a programming language or code whose elements and syntax are described in this part of the disclosure. Please refer to the glossary at the end of this section for a definition of terms used in this disclosure.

In the preferred embodiment of the present invention the software means accepts a programming language that represents a set of relationships between external sets of data and the open hierarchical data structure. Alternative embodiments of the software means accept coded values, produced by other software, as input arguments.

The input programming language in the preferred embodiment of the present invention consists of symbolic references to environmental resources and database commands, as well as a formal syntax and syntactical notation. Environmental resources refer to labels or names that identify a data source. This includes file specifications, and database and table names. These resources also include labels or references that can be applied to nodes in an open hierarchical data structure. Segments of database commands include reserved keywords and syntax supported by the underlying database, such as a WHERE clause found in an SQL statement. And finally, the programming command language syntax refers to the order of these elements, and the use of left and right parenthesis and commas as syntactical notation.

The input command has three elements: a link node, a list name, and list objects. A link node refers to a node in the open hierarchical data structure that will point to the new path. A list name refers to a menu entry name that is added to the structure and points directly to the new path. And lastly, the list object refers to one or more sources of external data.

FIG. 5a depicts an overview of the program routines in the present invention. At 72 the software means display a text input field. In the preferred embodiment of the present invention, the software means of the programming language is accessed at the database command line or though program control. Alternative embodiments of the access method, an input text field, include other computing environments such as an operating system, or graphical user interfaces (GUI) such as Windows 95 or NT.

At 73, routine 71 calls the parseCommand routine to check the command language syntax and verify the environmental resources. "cmdptr" points to the input command line string supplied by the end-user. If a problem is found with either the syntax or the environmental resources the routine issues an error message and returns an error flag. Otherwise, the parseCommand returns elmptr, a pointer that gets passed to the processElements routine at 74.

The flowchart of processElements 75 is depicted in FIG. 5b. Elmptr points to values that for the link_node, list_ node, and list_objects elements. The link_node identifies a node in an existing open hierarchical data structure that will point to the new path. The list_name argument creates a new branching node in the structure that will identify the new path by the list_name value. When both link_node and list_name arguments are given, a branching node corresponding to the list_name is added to the structure as a child of the link_node. Otherwise, the routine produces a path segment in the structure that can be linked into a series of connected paths at a later date.

The list_object element refers to the part of the programming language or code that establishes a relationship between sets of external data and nodes in the open hierarchical data structure. One or more embedded list objects make up the list object element. Each list_object consists of three elements: a display source, a display expression, and a link pair. The display source refers to a file or database specification. The display expression refers to a location in the display source, such as a column or a field reference, and includes text functions and look-up references supported by a host database. In addition, the display expression can also include a conditional statement recognized by the underlying database, such as a SQL-based WHERE clause for selecting specific rows from the database table.

The link pair links display values in one display source to another. The first element in the pair, referred to as a source link, is the link column associated with the display source.

The second element in the link column pair, referred to as the destination link, is either an object link or a list object. The list object, once again, is, list object=display source, display expression, (source link, object link or list object).

An object link refers to a link column, in a file or database structure, that links to an information object. When an object link is the second element in a link pair, the list object is referred to as a basis list object, otherwise the second element is a list object and it is referred to as a reference list object. A basis list object, created by a source link and object link pair, looks like, Books, Title, (BID, BID).

Every programming language command supplied to the software means of the present invention requires an embedded list object to have a basis list object at its core. The parseCommand routine called at 73 checks for this condition and issues an error message if a basis list object is not found.

A reference list object contains a link pair that associates one structure or table to another, and an element, or column in a table, to another element, or column, in the same structure, to represent lists in a menu path. The first element in the link pair corresponds to the display source; its display values generate parent nodes in a hierarchical path. The second element in the link pair, the embedded list object, produces links to the parent's children in its display source.

For instance, to generate menu data for a succession of list menus that progress from a list of languages, to a list of their associated book titles, the program code would be, "Books, Language, (BID, (Books, Title, (BID,BID)))".

As demonstrated by the example above, the programming language of the present invention employs embedded list objects to represent a series of relationships that can generate a series of nodes and path segments that correspond to a series of nested list menus. For instance, the one-to-many relationship between the Publishers table 70 and the Books table 60 lends itself to a menu list of publishers that progresses to a list menu of their titles. Here the program code is, "Publisher, Publisher_Name, (PID, (Books, Titles, (PID, BID)))".

Therefore, the list_objects_ptr in routine 75 can refer to one or more embedded list objects. At 77, routine 74 parses through list_object argument and to store data on each embedded list object in a record in a FIFO queue. Each record in the queue has 3 elements that correspond to the three elements in a list object: a display source, a display expression, and a link pair.

In a reference list object record, the destination subfield in the link pair field is always NULL. This indicates a direct association to the next record in the queue. In contrast, the destination subfield in a basis list object record is always NOT NULL, and thereby signals an object link and the last record in the queue.

After routine 74 has finished parsing through the list objects and creating records in the FIFO queue a call, is made to the buildPaths routine 80 at 78. The buildPaths routine 80, depicted in FIG. 5c, is a recursive procedure that takes four arguments:

parent_link—a parent node identifier.
que_ptr—a pointer to the FIFO queue.
table_index—a reference to a record number in the FIFO queue.
search_value—a link value.

When buildPaths routine 80 is first called by processElements 74 at 78 the search value defaults to all NON NULL values in a link column, and refers to the first record in the FIFO queue.

Each time buildPaths 80 executes at 83 it selects display rows in the source structure based on a logical AND of two conditions: the search_value and the WHERE clause. The WHERE clause is derived from the display expression in the list object argument and is used to select rows based on conditions set on columns in the source table. The serach_ value is set to NULL on the first call to routine 80. At 84, the routine sets the next_search_value from the current row's source link value.

Each display value in a basis table generates a leaf node that links to an information object. When procedure 80 has iterated through all the selected rows in the basis table it returns to the calling procedure.

Each row selected in a reference table causes procedure 80 to make a recursive call to itself at 85. Each unique display value in a reference list object generates a new branch node and establishes a reference to it using the next parent variable. Next_parent provides links to a parent's offspring in a destination structure. Non-unique display values refer to the most recent next_parent value in order to establish the correct links to offspring in a destination table source.

GLOSSARY basis list object—a list object that has a destination link value that links directly to an information object.
branching node—a nonroot node in an open hierarchical data structure whose child pointer links to another branching or leaf node in the structure. One or more branching nodes can point to the same branching or leaf node.
content menu—end-user menu system based on the open hierarchical data structure.
destination link—the second element in a link pair. The destination link value can refer to either an object link or an embedded list object.
display expression—the second element in a list object element that refers to a column or field in a display source and includes text functions and references supported by the host file or database management system. It can also include expressions, like an SQL-based WHERE clause, to refine a selection criteria.
display source—a database structure or model, or external file specification that refers to a source for menu data.
information object—one or more media elements, like text or graphic image, that form an object.
leaf node—a node located at the end of a succession of nodes in an open hierarchical data structure whose child pointer links to an information object. One or more leaf nodes can link to the same information object.
link column—a column or field that contains values that are used to locate menu data in a display source.

link pair—the third element of a list object, consisting of two link column references, a source link and a destination link. In a basis list object the destination value links directly to an information object. In a reference list object, an embedded list object replaces the destination value.

object link—a destination link value in a link pair that links to an information object.

open hierarchical data structure—a hierarchical data structure composed of nodes and arcs that flow from a single root node through one or more branch nodes to a leaf node at the end of a path. One or more paths can lead to the same leaf node and one or more leaf nodes to link to the same information object.

reference list object—a list object that relates a set of external data in a file or database to another set of external data. The destination value, in its link pair, refers to another list object.

root node—the entry point to an open hierarchical data structure. The root node, unlike a branch or leaf node, has only one pointer, a child arc.

source link—the first element in the link pair that refers to a link column in the display source.

list object—a programming language element that refers to sources of external data for a list menu. The list object expression has three elements: a display source, a display expression, and a link pair. List objects are embedded to generate nodes and paths from external data sources that will produce menu paths in a content menu.

sibling list—two or more branch or leaf nodes located at the same level in an open hierarchical data structure that are connected by sibling pointers.

display source—a database structure or file specification that refers to a memory location that contains text or graphic images that provide data that can be represented as an entry in a list menu.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto.

What is claimed is:

1. A software system on a computer processor used to generate menu data comprising:
   means for processing a set of input;
   means for opening an external file object;
   means for locating a source of menu data in said external file object;
   means for copying a topic object and a link object from said external file object;
   means for adding memory for a new node in an open hierarchical data structure;
   means for assigning said topic object to said new node in said open hierarchical data structure;
   means for assigning a pointer to said new node that links and said new node to a node in said open hierarchical data structure, wherein the node in said open hierarchical data structure serves as a parent node to said new node;
   and means for using said link object to determine a child node assignment for said new node in said open hierarchical data structure.

2. The software system of claim 1 wherein said software system is implemented in a computer language that is compatible with at least one operating system on said computer processor.

3. The software system of claim 1 wherein said software system includes a database language that is compatible with at least one database management system.

4. The software system of claim 1 wherein said external file object is compatible with at least one network system.

5. The software system of claim 1 wherein said source of menu data in said external file object is composed of file formats which are compatible with at least one database system.

6. The software system of claim 1 wherein said source of menu data in said external file object is composed of file formats which are compatible with at least one operating system.

7. The software system of claim 1 wherein said set of input comprises a set of arguments.

8. The software system of claim 1 wherein processing said set of input comprises a coded expression.

9. The software system of claim 1 wherein the means for locating said source of menu data in said external file object further includes a means for selecting a set of said source of menu data based on a selection condition.

10. A method for generating menu data using a software system on a computer processor, said method comprising:
    processing a set of input;
    opening an external file object;
    locating a source of menu data in said external file object;
    copying a topic object and a link object from said external file object;
    adding memory for a new node in an open hierarchical data structure;
    assigning said topic object to said new node in said open hierarchical data structure;
    assigning a pointer to said new node that links said new node to a node in said open hierarchical data structure that, wherein the node in said open hierarchical data structure serves as a parent node to said new node;
    and using said link object to determine a child node assignment for said new node in said open hierarchical data structure.

11. The method of claim 9 wherein said software system is implemented in a computer language that is compatible with at least one operating system on said computer processor.

12. The method of claim 10 wherein said software system includes a database language that is compatible with at least one database management system.

13. The method of claim 10 wherein said external file object is compatible with at least one network system.

14. The method of claim 10 wherein said source of menu data located in said external file object is comprised of file formats which are compatible with at least one database system.

15. The method of claim 10 wherein said source of menu data located in said external file object is composed of file formats which are compatible with at least one operating system.

16. The method of claim 10 wherein said set of input comprises a set of arguments.

17. The method of claim 10 wherein said set of input comprises a coded expression.

18. The method of claim 10 wherein locating said source of menu data in said external file object further includes selecting a set of said source of menu data based on a selection condition.

* * * * *